United States Patent
Zha

(10) Patent No.: US 10,459,239 B2
(45) Date of Patent: Oct. 29, 2019

(54) NAKED-EYE STEREOSCOPIC DISPLAY GRATING, MANUFACTURING METHOD AND DISPLAY DEVICE

(71) Applicant: Wuhan China Star Optoelectronics Technology Co., Ltd., Wuhan, Hubei (CN)

(72) Inventor: Guowei Zha, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 135 days.

(21) Appl. No.: 15/553,564

(22) PCT Filed: Jul. 17, 2017

(86) PCT No.: PCT/CN2017/093073
§ 371 (c)(1),
(2) Date: Aug. 24, 2017

(87) PCT Pub. No.: WO2018/196176
PCT Pub. Date: Nov. 1, 2018

(65) Prior Publication Data
US 2018/0307054 A1 Oct. 25, 2018

(30) Foreign Application Priority Data

Apr. 25, 2017 (CN) .......................... 2017 1 0277634

(51) Int. Cl.
*G02B 27/22* (2018.01)
*G02F 1/1335* (2006.01)
(Continued)

(52) U.S. Cl.
CPC ......... *G02B 27/2214* (2013.01); *G02B 6/005* (2013.01); *G02B 6/0053* (2013.01);
(Continued)

(58) Field of Classification Search
CPC .............. G02B 27/2214; G02B 6/0053; G02B 6/0065; G02B 6/0055; G02B 6/005;
(Continued)

(56) References Cited

U.S. PATENT DOCUMENTS

| 2014/0376074 A1 | 12/2014 | Chen | |
|---|---|---|---|
| 2015/0109666 A1* | 4/2015 | Wei | G02B 27/26 359/462 |
| 2017/0052312 A1* | 2/2017 | Jung | G02B 6/0068 |

FOREIGN PATENT DOCUMENTS

| CN | 104614866 A | 5/2015 |
|---|---|---|
| CN | 104977724 A | 10/2015 |

(Continued)

*Primary Examiner* — Charles S Chang
(74) *Attorney, Agent, or Firm* — Andrew C. Cheng

(57) ABSTRACT

A naked-eye stereoscopic display grating, manufacturing method and display device are disclosed. The method includes: preparing a transparent substrate; depositing a metal oxide layer on the transparent substrate; depositing a metal grating layer on the metal oxide layer, wherein, a reflectivity of the metal oxide layer is less than a reflectivity of the metal grating layer; and adopting a photolithography method to etch the metal oxide layer and the metal grating layer in order to expose a portion of the transparent substrate to form a transparent region and a reflective region arranged periodically. Accordingly, the present invention can increase the usage efficiency of the light, decrease a color crosstalk problem and low contrast ratio problem caused by an environment light reflected by the metal grating layer and the light in the panel.

10 Claims, 2 Drawing Sheets

(51) Int. Cl.
*F21V 8/00* (2006.01)
*H04N 13/312* (2018.01)
*H04N 13/351* (2018.01)

(52) U.S. Cl.
CPC ......... *G02B 6/0055* (2013.01); *G02B 6/0065* (2013.01); *G02B 27/225* (2013.01); *G02F 1/133555* (2013.01); *H04N 13/312* (2018.05); *H04N 13/351* (2018.05); *G02F 2201/307* (2013.01)

(58) Field of Classification Search
CPC ............. G02B 27/225; G02F 1/133555; G02F 2201/307; H04N 13/312; H04N 13/351
USPC .......................................................... 349/15
See application file for complete search history.

(56) References Cited

FOREIGN PATENT DOCUMENTS

| | | |
|---|---|---|
| CN | 105785576 A | 7/2016 |
| CN | 106094083 A | 11/2016 |
| CN | 205720908 U | 11/2016 |

\* cited by examiner

NAKED-EYE STEREOSCOPIC DISPLAY GRATING, MANUFACTURING METHOD AND DISPLAY DEVICE

BACKGROUND OF THE INVENTION

1. Field of the Invention

The present invention relates to a display technology field, and more particularly to a naked-eye stereoscopic display grating, manufacturing method and display device of the same.

2. Description of Related Art

People obtain perception of objective environment through visual, auditory, tactile, smell and taste. Realistically simulating the feeling of the spot is one of the important research topic of the modern technology.

A stereoscopic vision technology requires to be improved to be practically applied. A naked-eye 3D (3 Dimensions) technology is popular because of removing complex auxiliary devices, and the naked-eye technology includes a 3D grating, 3D lens technology, etc. wherein, the 3D grating technology has a better stereoscopic display effect because of blocking an image crosstalk among different viewpoints. The traditional rear and grating type naked-eye stereoscopic display device includes an LED, a light conductive plate, a diffusion plate, a brightening film, a grating layer, upper and lower polarized sheets and LCD panel. The grating layer is placed between the backlight module and the LCD panel. A portion of polarized light that pass through the brightening film is re-used, and the brightness is increased obviously. However, after passing through a light-shielding portion of the grating layer, the brightness is still loss more than half. Accordingly, the naked-eye display technology based on grating type faces a problem of too large brightness loss. At the same time, because a thickness of the traditional absorption type polarized sheet is about 100 μm, the development of the naked-eye stereoscopic technology is limited.

SUMMARY OF THE INVENTION

The present invention provides a naked-eye stereoscopic display grating, manufacturing method and a display device of the same, which can reflect a light at a reflective region of the metal grating layer back to the backlight system in order to increase the usage efficiency of the light, decrease a color crosstalk problem and low contrast ratio problem caused by an environment light reflected by the metal grating layer and the light in the panel.

In order to solve the above technology problem, a technology solution adopted by the present invention is: providing a display device, comprising: a naked-eye stereoscopic display grating; a liquid crystal display panel; and a backlight module; wherein, the naked-eye stereoscopic display grating is placed between a visible region of the liquid crystal display panel and the backlight module; wherein, the naked-eye stereoscopic display grating has a transparent region and a reflective region arranged periodically, wherein the transparent region includes a transparent substrate, the reflective region includes the transparent substrate, and a metal oxide layer and a metal grating layer sequentially disposed on the transparent substrate; and wherein, a reflectivity of the metal oxide layer is less than a reflectivity of the metal grating layer.

In order to solve the above technology problem, another technology solution adopted by the present invention is: providing a manufacturing method for a naked-eye stereoscopic display grating, and the method comprises steps of: preparing a transparent substrate; depositing a metal oxide layer on the transparent substrate; depositing a metal grating layer on the metal oxide layer, wherein, a reflectivity of the metal oxide layer is less than a reflectivity of the metal grating layer; and adopting a photolithography method to etch the metal oxide layer and the metal grating layer in order to expose a portion of the transparent substrate to form a transparent region and a reflective region arranged periodically.

In order to solve the above technology problem, another technology solution adopted by the present invention is: providing a naked-eye stereoscopic display grating, comprising: a transparent region and a reflective region arranged periodically, wherein the transparent region includes a transparent substrate, the reflective region includes the transparent substrate, and a metal oxide layer and a metal grating layer sequentially disposed on the transparent substrate; and wherein, a reflectivity of the metal oxide layer is less than a reflectivity of the metal grating layer.

The beneficial effects of the present invention is: comparing with the conventional art, through depositing a metal grating layer having a high reflectivity on the transparent substrate, a light at a reflective region of the metal grating layer can be reflected back to the backlight system to be re-used in order to increase the usage efficiency of the light. Besides, a metal oxide layer having a low reflectivity is also adopted, which can decrease a reflective light at a back side of the metal grating layer in order to decrease a color crosstalk problem and low contrast ratio problem caused by an environment light reflected by the metal grating layer and the light in the panel.

DETAILED DESCRIPTION OF THE PREFERRED EMBODIMENT

The following content combines with the drawings and the embodiment for describing the present invention in detail. It is obvious that the following embodiments are only some embodiments of the present invention. For the person of ordinary skill in the art without creative effort, the other embodiments obtained thereby are still covered by the present invention.

Figure 1:
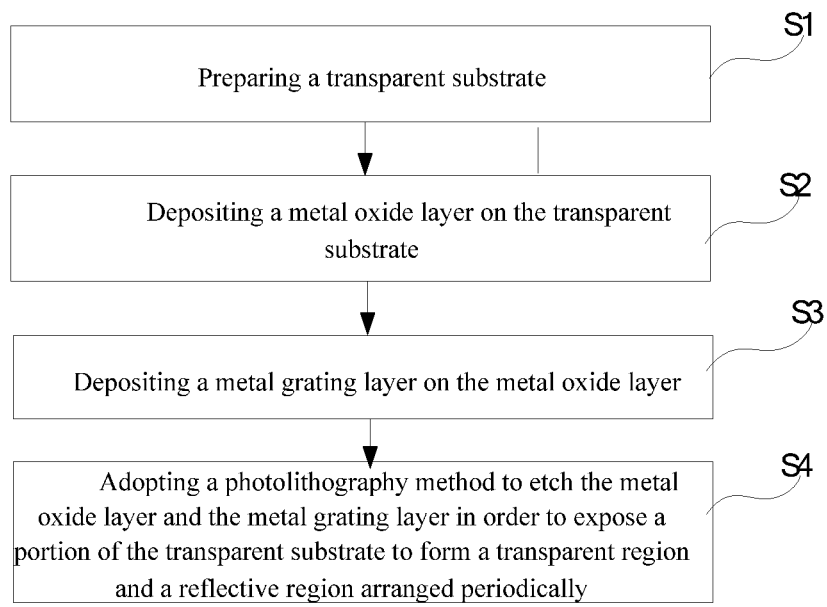
FIG. 1 is a flow chart of a manufacturing method for a naked-eye stereoscopic display grating according to an embodiment of the present invention.

With reference to FIG. 1, and FIG. 1 is a flow chart of a manufacturing method for a naked-eye stereoscopic display grating according to an embodiment of the present invention, and the method includes following steps:

S1, preparing a transparent substrate.

Wherein, the transparent substrate can be any types of substrates such as glass, Polyethylene terephthalate (PET), PolymethylMethacrylate (PMMA), PC, ceramic substrate or transparent plastic. In a specific embodiment, the transparent substrate of the naked-eye stereoscopic grating can directly adopt a glass substrate at an array substrate of a liquid crystal display device, the present invention is not specific limited.

S2, depositing a metal oxide layer on the transparent substrate.

After cleaning the transparent substrate, depositing a metal oxide layer on the transparent substrate, and the deposition of the metal oxide layer can adopt a sputtering or an evaporation method, the present invention is not specific limited.

In the present embodiment, the metal oxide layer can be molybdenum oxide (MoOx), at the visible wavelength band, reflectivity of the metal oxide layer is less than 25%. Of course, in another embodiment, the metal oxide layer can be another metal oxide layer that has a reflectivity less than 25%, and the present invention is not specifically limited.

S3, depositing a metal grating layer on the metal oxide layer.

In the step of depositing a metal grating layer on the metal oxide layer, the deposition of the metal grating can adopt a sputtering or an evaporation method, the present invention is not specific limited.

The metal grating layer in the present embodiment can include but not limit to one of gold, aluminum and silver. In the visible wavelength band, the reflectivity of the metal grating layer is greater than 90%, and a range of the visible wavelength band is 390 nm~780 nm. In the present invention, a reflectivity of the metal oxide layer is less than a reflectivity of the metal grating layer.

S4, adopting a photolithography method to etch the metal oxide layer and the metal grating layer in order to expose a portion of the transparent substrate to form a transparent region and a reflective region arranged periodically.

After depositing the metal grating layer, performing processes such as photoresist coating, exposing, developing, etching of a photoresist mask and stripping the photoresist in order to expose the transparent substrate to form the transparent region and the reflective region arranged periodically. Besides, in the above step, the etching of the metal oxide layer and the metal grating layer is finished by one photolithography step, no additional process is required.

In the above step, the transparent region can pass a light in order to provide a light source to the display panel. A width of the reflective region is $$W = \frac{(K-1)W_pQ}{Q-W_p},$$

a cycle of the reflective region is $$W_s = \frac{KW_pQ}{Q-W_p},$$

wherein, Wp is a pixel width of the display panel, Q is a pupil distance of two eyes, K is the number of viewpoints of the naked-eye stereoscopic display. That is, the process parameters of the metal grating are different according to the pixel width, the pupil distance of two eyes and the number of viewpoints. Besides, the parameters of the metal grating are different for different pixel widths of display panels.

Specifically, the naked-eye stereoscopic display grating manufactured by the above method is applied in a display panel, the naked-eye stereoscopic display grating is placed between a backlight system and the display panel. Because the naked-eye stereoscopic display grating has a transparent region and a reflective region, the light emitted from the backlight module, reach the display panel through the transparent region to provide a light source for images of different viewpoints. When the light emitted from the backlight module reach the reflective region, the light will enters the backlight system again by the reflection function of the metal grating layer and recycling through a reflection sheet at a back side of a light guide plate. Accordingly, a backlight usage efficiency of the naked-eye stereoscopic display device is increased in order to enhance the brightness.

When an environment light and a light in the panel are incident into the metal oxide layer having a low reflectivity and being located at a back side of the metal grating, the reflection of the light is obviously decreased in order to decrease a color crosstalk problem and low contrast ratio problem.

In the above embodiment, through depositing a metal grating layer having a high reflectivity on the transparent substrate, a light at a reflective region of the metal grating layer can be reflected back to the backlight system to be re-used in order to increase the usage efficiency of the light. Besides, a metal oxide layer having a low reflectivity is also adopted, which can decrease a reflective light at a back side of the metal grating layer in order to decrease a color crosstalk problem and low contrast ratio problem caused by an environment light reflected by the metal grating layer and the light in the panel.

Figure 2:
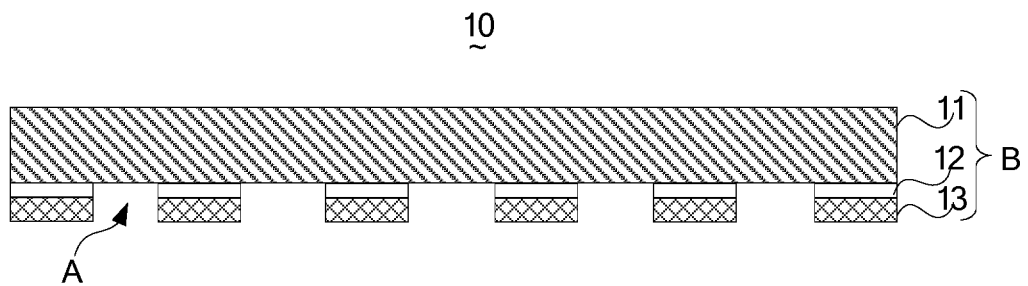
FIG. 2 is a schematic diagram of a naked-eye stereoscopic display grating according to an embodiment of the present invention.
Figure 3:
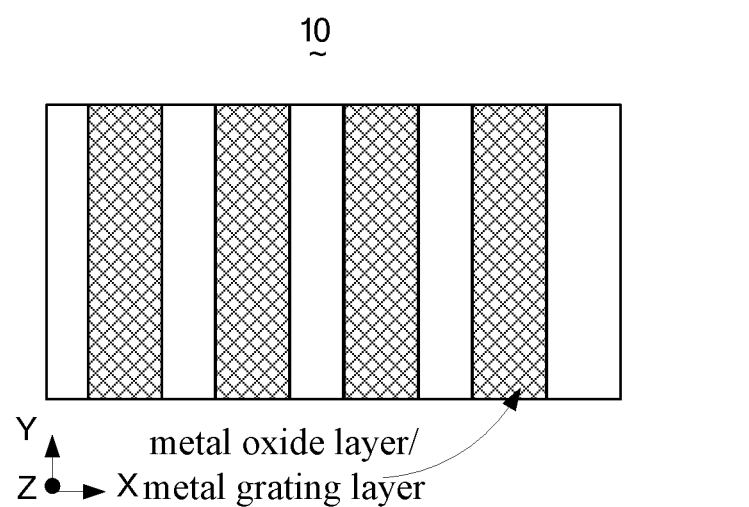
FIG. 3 is a top view of the naked-eye stereoscopic display grating according to an embodiment of the present invention.

With reference to FIG. 2 and FIG. 3, FIG. 2 is a schematic diagram of a naked-eye stereoscopic display grating according to an embodiment of the present invention, and FIG. 3 is a top view of the naked-eye stereoscopic display grating according to an embodiment of the present invention. As shown in FIG. 2, the naked-eye stereoscopic display grating 10 includes: a transparent region A and a reflective region B arranged periodically.

Wherein, the transparent region A is used for passing through a light in order to provide a light source for the display panel, and including a transparent substrate 11. Wherein, the transparent substrate 11 can be any types of substrates such as glass, Polyethylene terephthalate (PET), PolymethylMethacrylate (PMMA), PC, ceramic substrate or transparent plastic. In a specific embodiment, the transparent substrate of the naked-eye stereoscopic grating can directly adopt a glass substrate at an array substrate of a liquid crystal display device, the present invention is not specific limited.

The reflective region B includes a transparent substrate 11, and a metal oxide layer 12 and a metal grating layer 13 sequentially disposed on the transparent substrate 11. Wherein, the reflectivity of the metal oxide layer 12 is less than the reflectivity of the metal grating layer 13. Besides, a width of the reflective region is $$W = \frac{(K-1)W_pQ}{Q-W_p},$$

a cycle of the reflective region is $$W_s = \frac{KW_pQ}{Q-W_p},$$

wherein, Wp is a pixel width of the display panel, Q is a pupil distance of two eyes, K is the number of viewpoints of the naked-eye stereoscopic display. That is, the process parameters of the metal grating are different according to the pixel width, the pupil distance of two eyes and the number of viewpoints. Besides, the parameters of the metal grating are different for different pixel widths of display panels.

In the present embodiment, the metal oxide layer 12 can be molybdenum oxide (MoOx), at the visible wavelength band (390 nm~780 nm), reflectivity of the metal oxide layer is less than 25%. Of course, in another embodiment, the metal oxide layer can be another metal oxide layer that has a reflectivity less than 25%, and the present invention is not specifically limited.

The metal grating layer 13 in the present embodiment can include but not limit to one of gold, aluminum and silver. In the visible wavelength band, the reflectivity of the metal grating layer is greater than 90%, and a range of the visible wavelength band is 390 nm~780 nm. In the present invention, the reflectivity of the metal oxide layer is less than the metal grating layer.

In the above embodiment, through depositing a metal grating layer having a high reflectivity on the transparent substrate, a light at a reflective region of the metal grating layer can be reflected back to the backlight system to be re-used in order to increase the usage efficiency of the light. Besides, a metal oxide layer having a low reflectivity is also adopted, which can decrease a reflective light at a back side of the metal grating layer in order to decrease a color crosstalk problem and low contrast ratio problem caused by an environment light reflected by the metal grating layer and the light in the panel.

Figure 4:
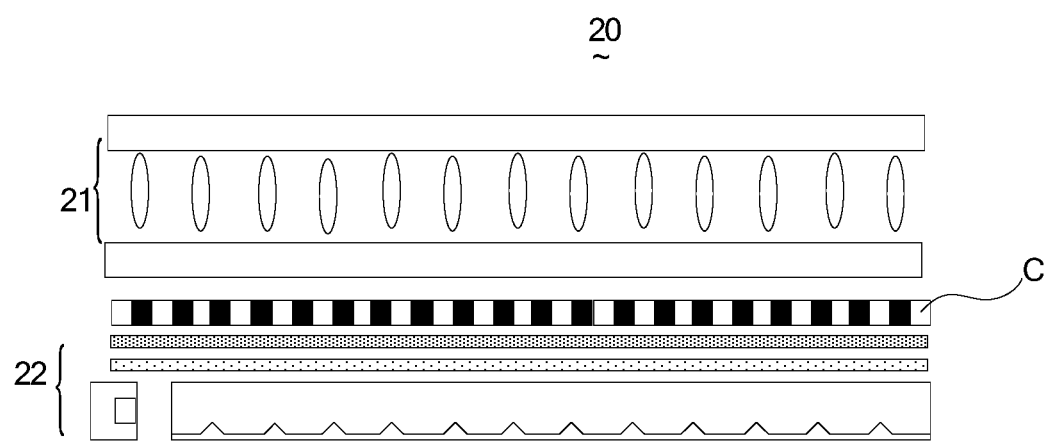
FIG. 4 is a schematic diagram of a display device according to an embodiment of the present invention.

With reference to FIG. 4, FIG. 4 is a schematic diagram of a display device according to an embodiment of the present invention. In a specific embodiment, the display device 20 includes a naked-eye stereoscopic display grating C, a liquid crystal display panel 21 and a backlight module 22. Wherein, the naked-eye stereoscopic display grating C is placed between a visible region of the liquid crystal display panel 21 and the backlight module 22. The specific embodiment can refer to the content described above, no more repeating.

In summary, the person skilled in the art can understood, the present invention provides a naked-eye stereoscopic display grating, manufacturing method and display device, through depositing a metal grating layer having a high reflectivity on the transparent substrate, a light at a reflective region of the metal grating layer can be reflected back to the backlight system to be re-used in order to increase the usage efficiency of the light. Besides, a metal oxide layer having a low reflectivity is also adopted, which can decrease a reflective light at a back side of the metal grating layer in order to decrease a color crosstalk problem and low contrast ratio problem caused by an environment light reflected by the metal grating layer and the light in the panel.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A display device, comprising:
a naked-eye stereoscopic display grating;
a liquid crystal display panel; and
a backlight module;
wherein, the naked-eye stereoscopic display grating is placed between a visible region of the liquid crystal display panel and the backlight module;
wherein, the naked-eye stereoscopic display grating has a transparent region and a reflective region arranged periodically, wherein the transparent region includes a transparent substrate, the reflective region includes the transparent substrate, and a metal oxide layer and a metal grating layer sequentially disposed on the transparent substrate; and
wherein, a reflectivity of the metal oxide layer is less than a reflectivity of the metal grating layer;
wherein, the metal oxide layer is molybdenum oxide (MoOx) with a reflectivity less than 25% at the visible wavelength band, and a range of the visible wavelength band is 390 nm~780 nm.

2. The display device according to claim 1, wherein, the transparent region is used for passing through a light in order to provide a light source for the display panel, a width of the reflective region is $$W = \frac{(K-1)W_p Q}{Q - W_p},$$

a cycle of the reflective region is $$W_s = \frac{K W_p Q}{Q - W_p};$$

and
wherein, Wp is a pixel width of the display panel, Q is a pupil distance of two eyes, K is the number of viewpoints.

3. The display device according to claim 1, wherein, a reflectivity of the metal grating layer is greater than 90% at the visible wavelength band.

4. A manufacturing method for a naked-eye stereoscopic display grating, and the method comprises steps of:
preparing a transparent substrate;
depositing a metal oxide layer on the transparent substrate;
depositing a metal grating layer on the metal oxide layer, wherein, a reflectivity of the metal oxide layer is less than a reflectivity of the metal grating layer; and
adopting a photolithography method to etch the metal oxide layer and the metal grating layer in order to expose a portion of the transparent substrate to form a transparent region and a reflective region arranged periodically;
wherein, the metal oxide layer is molybdenum oxide (MoOx) with a reflectivity less than 25% at the visible wavelength band, and a range of the visible wavelength band is 390 nm~780 nm.

5. The manufacturing method according to claim 4, wherein, the transparent region is used for passing through a light in order to provide a light source for the display panel, a width of the reflective region is $$W = \frac{(K-1)W_p Q}{Q - W_p},$$

a cycle of the reflective region is $$W_s = \frac{K W_p Q}{Q - W_p};$$

and
wherein, Wp is a pixel width of the display panel, Q is a pupil distance of two eyes, K is the number of viewpoints.

6. The manufacturing method according to claim 4, wherein, a reflectivity of the metal grating layer is greater than 90% at the visible wavelength band, and a range of the visible wavelength band is 390 nm~780 nm.

7. The manufacturing method according to claim 4, wherein, the metal grating layer is manufactured by one of gold, aluminum and silver.

8. A naked-eye stereoscopic display grating, comprising:
a transparent region and a reflective region arranged periodically, wherein the transparent region includes a transparent substrate, the reflective region includes the transparent substrate, and a metal oxide layer and a metal grating layer sequentially disposed on the transparent substrate; and
wherein, a reflectivity of the metal oxide layer is less than a reflectivity of the metal grating layer;
wherein, the metal oxide layer is molybdenum oxide (MoOx) with a reflectivity less than 25% at the visible wavelength band, and a range of the visible wavelength band is 390 nm~780 nm.

9. The naked-eye stereoscopic display grating according to claim 8, wherein, the transparent region is used for passing through a light in order to provide a light source for the display panel, a width of the reflective region is $$W = \frac{(K-1)W_p Q}{Q - W_p},$$

a cycle of the reflective region is $$W_s = \frac{KW_p Q}{Q - W_p};$$

and wherein, Wp is a pixel width of the display panel, Q is a pupil distance of two eyes, K is the number of viewpoints.

10. The naked-eye stereoscopic display grating according to claim 8, wherein, a reflectivity of the metal grating layer is greater than 90% at the visible wavelength band.

* * * * *